3,216,146
FREE FLOATING FISH FLOAT
Wendell V. Johnson, 212 Oakwood Ave., and James E. Johnson, 100 E. Forrest Ave., both of East Peoria, Ill.
Filed June 8, 1964, Ser. No. 373,476
5 Claims. (Cl. 43—43.11)

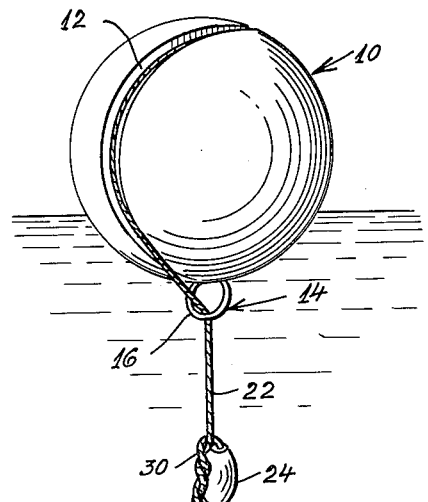
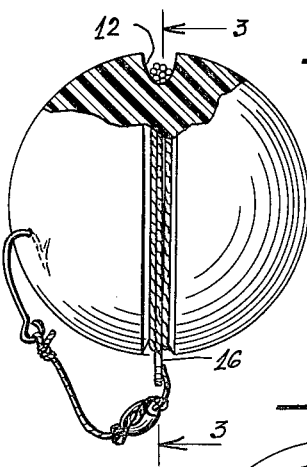
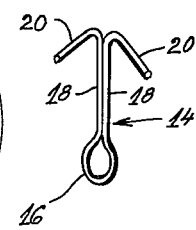
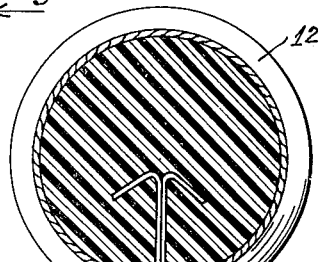
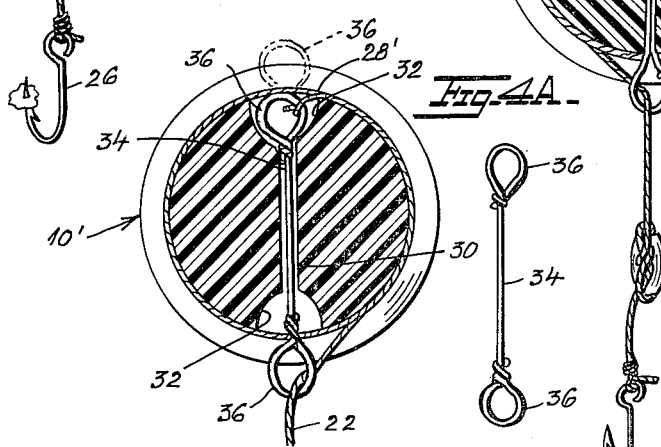
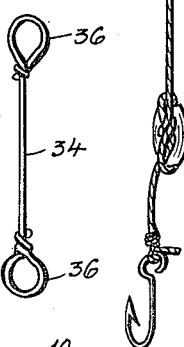
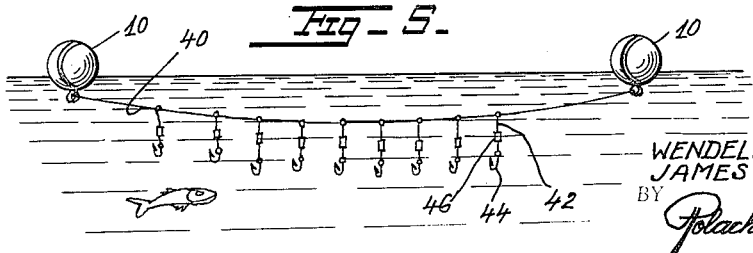

This invention relates to a free floating fishing float and it consists in the combinations, constructions and arrangements of parts hereinafter described and claimed.

Broadly the invention comprises a semisolid plastic spherical body with an annular shallow groove on the outer surface thereof centrally of the body for containing convolutions of the spare line or the entire line when not in use. A ring protrudes outwardly of the groove and is securely anchored in the body of the float.

A principal object of the invention is to provide a free floating baited hook and line float that will effectively contain, slow down and/or keep located a hooked fish.

Another object of the invention is to provide a float of this type that also can be used in so-called "can," "jug" or "jump" line fishing, as a marker buoy, channel marker or seine float.

A further object is to provide a float of this type that can be cast out with pole or rod and reel for drift fishing where more float resistance against the fish than ordinary bobbers will supply is desired.

Yet another object is to provide a float of this type that is visible both day and night.

Still another object is to provide a float of this type with means in common for containing the spare fishing line or the entire line when not in use and for depth gauging.

It is also an object to provide a float of this kind with means for providing an automatic line depth adjustment and for providing an automatic line stop at the desired depth chosen.

Still a further object is to provide a float of this type that serves to store hooks safely, securely and neatly.

Other objects of the invention are to provide a float of this type that serves to store hooks safely, securely and neatly, that will withstand a dead pull from the center of the hook equaling or exceeding twenty-five pounds, and that has no moving parts to get out of order.

A specific object is to provide a spherical free floating fishing float wherein the fishing line is frictionally held all around the float.

It is a further object to provide a float of this kind that is simple and sturdy in construction and is economical to manufacture and is highly efficient for the purposes intended.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is an elevational view illustrating the manner of attachment of a fishing line and illustrating the position of the free floating fishing float in the water.

FIG. 2 is an enlarged side elevational view of the float illustrating the manner of storing the line and hook when not in use, parts being shown broken away.

FIG. 3 is a vertical sectional view taken on the line 3—3 of FIG. 2 showing the lead line and hook in dependent position.

FIG. 3A is a side elevational view of the guiding eye.

FIG. 4 is a view similar to FIG. 3 of a float embodying a modified form of the invention.

FIG. 4A is a side elevational view of the combined line fastening and guiding member.

FIG. 5 is a diagrammatical and elevational view illustrating a modified use of the invention.

Referring now in detail to the various views of the drawings, in FIG. 1 a free floating fishing float embodying one form of the invention is illustrated and designated generally at 10. The float 10 comprises a body of semisolid foamed-in-place polyurethane, spherical in shape. A shallow annular groove 12 with a curved base is formed in and encircles the outer surface of the body. The body is molded from the semisolid foamed-in-place polyurethane so that the body will absorb a minimum of moisture and will not leak. Since the body is one piece and is "hard sponge" solid completely, constituted by thousands of tiny air cells, the body will not under normal use, break, crack, and will withstand all types of severe heat and weather conditions. The natural color through the entire body is pure white so as to provide the maximum visibility both day and night.

A fishing line fastening and guide device 14 is anchored in the body of the float when the body is molded, the guide device comprising an eye 16 formed with a pair of parallel contacting shank portions 18, 18, the ends of the shank portions being bent into hooks 20, 20. The eye 16 protrudes outwardly of the body of the float through the groove 12.

The float is completely equipped with fishing line 22, sinker 24 and hook 26. The fishing line is approximately 6½ feet in length of braided, neutral colored, 80-lb. test nylon line. This line provides maximum strength, will not rot or mildew and has a neutral color so as to avoid spooking the fish. One end of the line is secured to the eye by a knot 28 and the hook 26 is securely fixed to the other end of the line. The sinker 24 is formed of lead and may be adjustably fastened along the line by tying a half loop 30 around the body of the sinker or by tying a half knot just below the sinker at the desired depth. If a sinker is not desired, the sinker can be run up the line to the tie-on point at the eye 16 and a half knot formed just below the sinker to hold it there.

By passing the hook, line and sinker through the metal eye 16, an automatic line pedth adjustment to each given foot of depth is achieved and changed by simply unlooping or relooping the line in the groove 12. Passage of the line through the eye 16 forms an automatic line stop at the desired depth chosen.

The semisolid foamed-in-place plastic material, constituting the body of the float, effords a very safe, secure and neat storage for the hook. This is simply done by burying the point of the hook into the material of the body. The hook may readily be pulled out of the material when needed for reuse.

The float thus equipped will withstand a dead pull from the center of the hook equalling or exceeding twenty-five pounds, and the weight of the thus equipped float plus its cubic into volume will indicate high sensitivity to feeding fish while still capable of maintaining a 2-lb. steady pull against a hooked fish. The float has no moving parts so that it will remain completely trouble free and will also serve its basic purpose even if damaged to some extent.

Referring now to FIGS. 4 and 4A, herein is shown a modified form of float 10' having a solid spherical body of semisolid foamed-in-place polyurethane plastic material with a passage 30 extending through the axial center of the body, the ends of the passage being enlarged as indicated at 32. A rod 34 formed with loops 36 at the ends thereof extends through the passage 30, the enlargements 32 being dimensioned to receive the loops. In this float 10', the fishing line 22 may be tied to either one of the loops 36, in FIG. 4 it being shown tied to the top loop 36 by a knot 28', encircling half of the body and passing through the bottom loop 36. The top loop 36 is shown seated in the enlargement 32 at the top so that the bottom loop 36 protrudes outwardly of the body of the float and serves as a guide for the fishing line. The top loop serves as an anchor.

In the modification shown in FIG. 5, the improved float is shown used in a type of fishing known as "jump" line method of fishing. Herein a pair of floats, such as the float 10, is tied to the ends of a line 40 and partly submerged in the water. A plurality of fishing lines 42 are secured at one end to the line 40 at spaced intervals therealong, hooks 44 being secured to the other depending ends of the lines 42, and sinkers 46 are suitably fastened to the lines adjacent the hooks.

In all forms of the invention, the float moves in a substantially free floating position (FIG. 1) on the surface of the water and suspends the hook and sinker end of the fishing line at any preset depth below the surface of the water.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent it:

1. A free floating fishing float having a spherical body of semisolid foamed-in-place polyurethane material, said body having an annular groove around the outer surface thereof, said body having a central passage extending from one side of said body to the other and intersecting said groove at each side of said body, an elongated wire rod extending through said passage, said rod having loops on the ends thereof, said passage terminating in enlargements intersecting the groove, one of said loops adapted to anchor one end of a fishing line, the other of said loops adapted to guide the attached fishing line away from the body.

2. A free floating fishing float having a spherical body of semisolid foamed-in-place polyurethane material, said body having an annular groove around the outer surface thereof, said body having a central passage extending from one side of said body to the other and intersecting said groove at each side of said body, an elongated wire rod extending through said passage and slidably mounted therein, said rod having loops on the ends thereof, said passage terminating in enlargements intersecting the groove, said rod being dimensioned so as to have one loop seated in one of the enlargements for anchoring one end of a fishing line while the other loop extends outwardly of the body for guiding the attached fishing line.

3. A combination free floating fishing float having a spherical body of semisolid foamed-in-place polyurethane plastic material, said body having an annular groove around the center thereof, a metallic eye anchored in said body and protruding outwardly of said body, said eye extending through said groove, and a fishing line adapted to have a fish hook at one end, the other end being secured to said eye, the line encircling said groove at least one time and having an intermediate portion of said line passing through said eye.

4. A combination free floating fishing float having a spherical body of semisolid foamed-in-place polyurethane material, said body having an annular groove around the outer center thereof, a metallic eye anchored in said body and protruding outwardly of said body, said eye extending through said groove, a fishing line adapted to have a fish hook at one end, the other end being secured to said eye, the line encircling said groove at least one time and having an intermediate portion of said line passing through said eye for fastening the end of said fishing line to said groove, and said eye adapted to guide said fishing line outwardly of said body.

5. A combination free floating fishing float having a spherical body of semisolid foamed-in-place polyurethane material, said body having an annular groove around the outer surface thereof, an eye member with elongated shanks in side-by-side relation embedded in the material of the body, the inner ends of the shanks being bent and hooked, said eye protruding through the groove outwardly of said body, a fishing line adapted to be fastened to said body, said fishing line adapted to have a fish hook at one end, the other end being secured to said eye, the line encircling said groove at least one time and having an intermediate portion of said line passing through said eye, and said eye adapted to guide said fishing line outwardly of said body.

References Cited by the Examiner

UNITED STATES PATENTS

| | | | |
|---|---|---|---|
| 769,356 | 9/04 | Reis | 43—43.1 |
| 1,138,896 | 5/15 | Ryan | 43—27.4 |
| 2,393,070 | 1/46 | Saloun | 43—44.91 |
| 2,977,608 | 4/61 | Brown et al. | |

SAMUEL KOREN, *Primary Examiner.*